(No Model.)

C. T. RANNEY.
DRIP CUP ATTACHMENT FOR REFRIGERATORS.

No. 498,489. Patented May 30, 1893.

Witnesses
John W. Adams
Jno. L. Cowdrow

Inventor
Charles T. Ranney
by Dayton, Poole & Brown
his Attorneys.

UNITED STATES PATENT OFFICE.

CHARLES T. RANNEY, OF GREENVILLE, MICHIGAN, ASSIGNOR TO THE RANNEY REFRIGERATOR COMPANY, OF SAME PLACE.

DRIP-CUP ATTACHMENT FOR REFRIGERATORS.

SPECIFICATION forming part of Letters Patent No. 498,489, dated May 30, 1893.

Application filed December 6, 1892. Serial No. 454,233. (No model.)

*To all whom it may concern:*

Be it known that I, CHARLES T. RANNEY, of Greenville, in the county of Montcalm and State of Michigan, have invented certain new and useful Improvements in Drip-Cup Attachments for Refrigerators; and I do hereby declare that the following is a full, clear, and exact description thereof, reference being had to the accompanying drawings, and to the letters of reference marked thereon, which form a part of this specification.

My invention relates to drip cups or traps for the waste-pipes of refrigerators; such cups or traps being designed to seal the waste-pipes against the entrance of air through the waste-pipes and thus serve to prevent undesirable raising of the internal temperature of the refrigerators.

My invention relates, more particularly to attachments for tilting the drip-cups or traps so as to wholly or partially empty the cups or traps of waste-water contained therein.

The objects of my invention are to produce drip-cup or trap tilting attachments which shall be simple, strong, durable, and inexpensive in construction, and capable of application to a great variety of drip-cups or traps, and which shall, furthermore, be entirely concealed from the view, so as not to detract from the ornamental appearance of the refrigerators.

A still further object of my invention is to produce drip-cup or trap tilting attachments which, in addition to the advantages above enumerated, can be easily and conveniently operated by an attendant, while removing the drip-pan, and which shall automatically return the drip cup to its normal position, as soon as released by an attendant.

To the above purposes, my invention consists in certain peculiar and novel features of construction and arrangement, as hereinafter described and claimed.

In order that my invention may be fully understood, I will proceed to describe it with reference to the accompanying drawings, in which—

Figure 1:
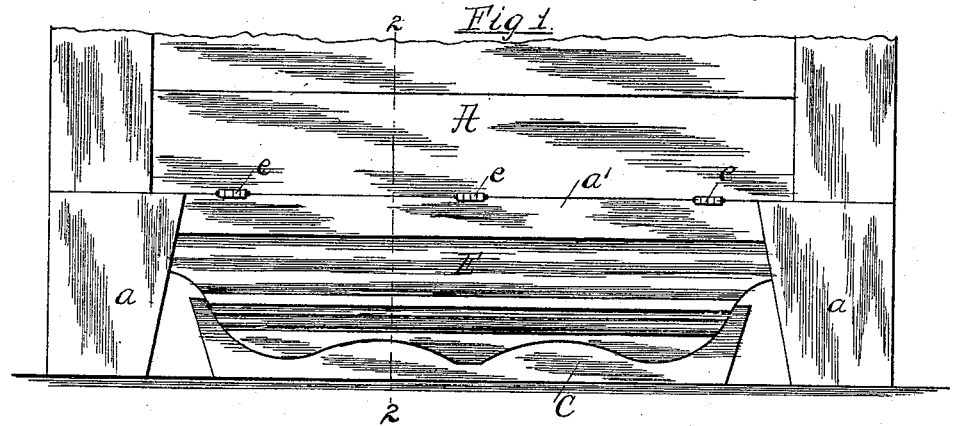
Figure 2:
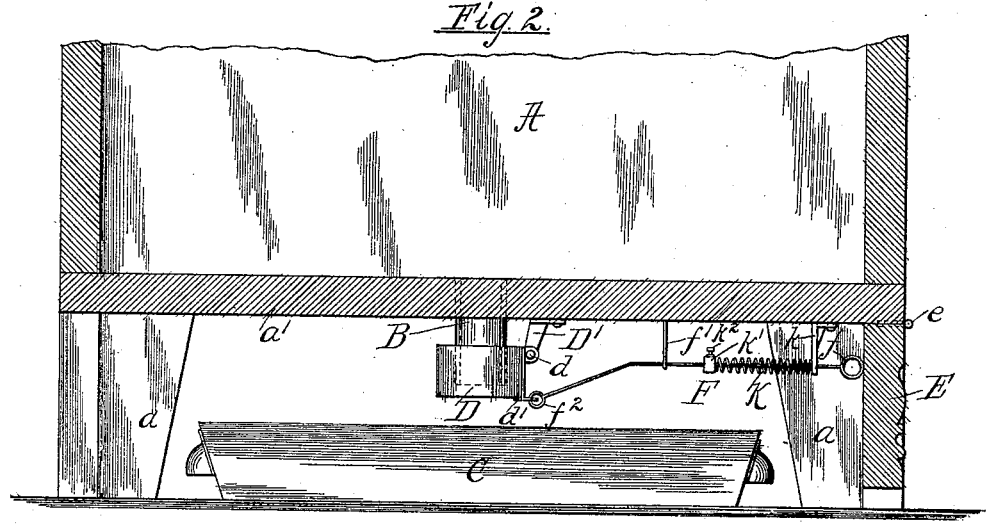
Figure 3:
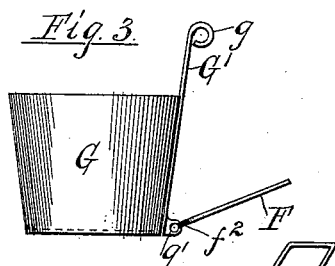
Figure 4:
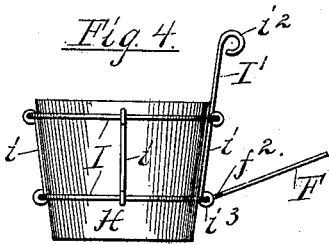
Figure 5:
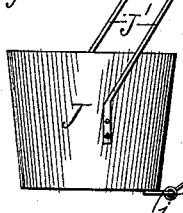

Figure 1 is a front elevation of the lower part of a refrigerator-casing having my invention applied thereto. Fig. 2 is a transverse vertical section of the same, taken on the line 2—2 of Fig. 1. Fig. 3 is a detached view, in side elevation, of a modified form of pivotal drip-cup. Fig. 4 is also a detached view, in side elevation, of a still further modification in the form of drip-cup and also of a skeleton pivotal holder for said cup. Fig. 5 is a detached view, in perspective, of a still further modification of the drip-cup and its hanger.

In the said drawings, A designates the lower part of the casing or frame of a refrigerator, and $a$ the legs or supports of the same, while B designates the drip-pipe which is shown as inserted at its upper end through the bottom $a'$ of the refrigerator-casing A and as depending below said bottom in the usual manner.

It is to be understood that the refrigerator itself may be of the usual or of any known type of construction; the legs or supports $a$ sustaining the bottom $a'$ of the casing at such height above the floor as will permit a pan C, or any other suitable receptacle, to be placed beneath the refrigerator, so as to receive the drip-water therefrom.

In Fig. 2, I have shown a bracket D' as depending from the bottom $a'$ of the refrigerator-casing at a point adjacent to the drip-pipe B, and a drip-cup D as pivotally connected at one side, as at $d$, to the lower end of the bracket D'; the arrangement being such that normally the drip-cup D occupies a horizontal position beneath the lower end of the drip-pipe B, so that the lower end of said pipe shall be close to the bottom of the drip-cup and usually immersed in the waste-water with which the drip-cup is either wholly or partially filled. E designates a strip or piece of molding which is shown as located between the front legs or supports $a$ of the refrigerator-casing A, and also as attached at its upper edge to the lower front edge of said refrigerator-casing by suitable hinges $e$; the strip E being thus adapted to normally depend vertically between the legs or supports $a$, and also to be swung upward and outward or forward. A rod F is shown as extending rearwardly beneath the bottom $a'$ of the refrigerator-casing and as having a ring or handle $f$ at its front or outer end, and also as passed through the lower end of a guide bracket or arm $f'$ which is pendent from the bottom $a'$ at a point considerably in front of the pivot-bracket D'. The inner or rear end-portion of the rod F is shown as bent obliquely downward and rearward and as connected at its rear or inner extremity to the front part of the bottom of the cup D; a ring or eye $f^2$ at the rear extremity of the rod F, passing through the lug $d'$ on the bottom of the cup D, being shown as the means for such connection. A second hanger $k$ is shown as depending vertically from the bottom $a'$ of the refrigerator, at a point between the hanger $f'$ and the strip E of molding, the front end-portion of the rod F working loosely through this hanger $k$. A spiral spring K surrounds the rod F at points between the hanger $k$ and a collar $k'$ which surrounds the rod F and which is secured thereto by a set-screw $k^2$ or in any suitable manner.

In Fig. 3, I have shown a modified form of drip-cup which is peculiarly adapted for use in connection with the described attachments. This cup G is preferably of sheet-metal (as is also the drip-cup D) and closely resembles the drip-cup D in the form of its body-portion. At one side, however, this drip-cup G is shown as formed, or otherwise provided, with an upwardly extending arm or standard G' at the upper end of which is formed an eye $g$; the intention being to pass a staple, or an equivalent device, through the eye $g$ and to insert said staple into the under side of the bottom of the refrigerating-casing, so as to pivotally suspend the drip-cup from said bottom. In this instance, the ring or eye $f^2$, at the rear or inner end of the rod F, is passed through a lug or ear $g'$ projecting from the front side of the cup G, near the bottom thereof. In all other respects, the attachments are the same as those previously described.

In Fig. 4, I have shown a still further modification of the drip-cup and its pivotal connections. In this instance, the body-portion of the cup H is shown as of the same form as the body-portion of the cup G, but with the arm or standard G' and lug $g'$ omitted. The drip-cup H is shown as inserted rearwardly into a skeleton supporting-frame or holder, which is preferably formed of wire, and which is shown as composed of two parallel horizontal portions I connected together by a number of vertical portions $i$, so as to surround or embrace the sides of the cup H. One of the vertical portions $i$ is prolonged, so as to form an upwardly extending arm or standard I', which is located at the front side of the frame or holder and at the upper end of which is formed a ring or eye $i^2$. The intention is to pass a staple, or an equivalent device, through the ring or eye $i^2$ and to insert said staple into the under side of the refrigerator-bottom so as to pivotally suspend the skeleton frame or holder therefrom. In this instance, the ring or eye $f^2$ at the rear or inner end of the rod F is shown as passed through the eye $i^3$ at the point of juncture of the front vertical portion $i$ of the holder with the lower horizontal portion I thereof. In all other respects, the attachments are also the same as those previously described.

In Fig. 5, I have shown a still further modification of the drip-cup. In this instance, the cup J is similar in form to the cup G and is provided with a lug or ear $j$ similar in form and purpose to the lugs $d'$ and $g'$ of the cups D and G. This cup is provided with a bail J' of approximately inverted U-form; the ends of the bail embracing the sides of the cup, and being riveted or soldered thereto. Suitable staples are intended to embrace the cross-bar of the bail and to be driven into the bottom of the refrigerator, so as to support the cup.

From the above description, it will be seen that as the waste-water escapes from the refrigerator-casing through the drip-pipe B, it fills the drip-cup so as to immerse the lower end of said pipe and thus prevent air from entering the outlet of the refrigerator. The pressure of the spring K acting upon the rod F and against the hanger $k$, is sufficient to retain the drip-cup in its normal horizontal position, even when said cup is filled with waste-water. As the water continues to escape from the refrigerator it overflows from the drip-cup and falls into the pan or receptacle C, finally filling the latter and necessitating its removal from beneath the refrigerating-casing, and also requiring that the pan or receptacle should be emptied. While the pan is removed and being emptied of its contained water, it is necessary that the drip-cup should be either partially or wholly emptied of its contained water so that no water shall fall upon the floor before the pan or receptacle is returned to its place. In removing the pan from beneath the refrigerator, the strip or piece E of molding is first raised, so as to expose the front end of the rod F, and the attendant then pulls forward upon the rod F; compressing the spring K and tilting the cup so as to either partly or wholly empty its water into the pan C. The attendant now releases the rod F, so as to permit the spring K to expand and return the drip-cup to its normal position, and then removes the pan C. After emptying the pan, the attendant again raises the strip E and replaces the pan beneath the drip-cup. Thus it will be seen that, by virtue of the attachments above described, I have wholly avoided all possibility of the escape of water from the drip-cup during the absence of the pan or receptacle for catching of the same.

Having thus described my invention, what I claim as new therein, and desire to secure by Letters Patent, is—

1. A refrigerator having a drip-cup provided with spring-pressed connections serving to retain the drip-cup in its normal position and extending toward the front of the refrigerator; the spring surrounding said connections, substantially as set forth.

2. A refrigerator provided with a pivoted drip-cup, a sliding operating rod connected to the drip-cup, a compressible spring connected to and surrounding the operating-rod and serving to retain the drip-cup in its normal position, substantially as set forth.

3. A refrigerator provided with a pivoted drip-cup secured to its bottom, a pull-rod secured to the drip-cup and extending forward therefrom, guide-hangers, through which the pull-rod passes, depending from the refrigerator bottom, and a spiral spring surrounding the rod and interposed between one of the hangers and a collar on the rod, substantially as set forth.

In testimony that I claim the foregoing as my invention I hereunto affix my signature in presence of two witnesses.

CHARLES T. RANNEY.

Witnesses:
   T. I. PHELPS,
   A. B. GARDNER.